United States Patent [19]

Hashiba et al.

[11] Patent Number: 5,067,367
[45] Date of Patent: Nov. 26, 1991

[54] STEERING WHEEL

[75] Inventors: Takahiro Hashiba; Kouichi Kaga, both of Aichi, Japan

[73] Assignee: Toyoda Gosei Co., Ltd., Nishikasugai, Japan

[21] Appl. No.: 438,269

[22] Filed: Nov. 20, 1989

[30] Foreign Application Priority Data

Nov. 30, 1988 [JP] Japan .................. 63-156378[U]

[51] Int. Cl.⁵ .............. B62D 1/04; B60R 21/05
[52] U.S. Cl. ................................. 74/552; 280/750
[58] Field of Search ............ 74/552, 558; 280/750; 29/894.1

[56] References Cited

U.S. PATENT DOCUMENTS

| | | | |
|---|---|---|---|
| 4,628,761 | 12/1986 | Niwa | 74/552 |
| 4,790,209 | 12/1988 | Ishida | 74/552 |
| 4,939,951 | 7/1990 | Kaneko | 74/552 |

FOREIGN PATENT DOCUMENTS

| | | | |
|---|---|---|---|
| 58-152660 | 9/1983 | Japan | 74/552 |
| 58-156453 | 9/1983 | Japan | 74/552 |
| 0261751 | 12/1985 | Japan | 280/750 |
| 0060348 | 3/1986 | Japan | 280/750 |
| 62-187649 | 8/1987 | Japan | . |
| 62-187650 | 8/1987 | Japan | . |

Primary Examiner—Vinh T. Luong
Attorney, Agent, or Firm—Cushman, Darby & Cushman

[57] ABSTRACT

A steering wheel is provided in which an impact energy absorber composed of a deformation portion having a substantially inverted U-shape formed by bending sheet metal and a base portion connected at the lower end of the deformation portion is disposed between a boss in a boss portion and a pad. The deformation portion is provided with an upper wall portion which inclines to the front side, front and rear leg portions extending downward from front and rear edges of the upper wall portion, and a bending portion disposed at lower ends of the front and rear edges and connected to the base portion. The front and rear leg portions buckle inwardly at the middle. Also, the intersection of the front leg portion with the bending portion thereof is arranged at a position substantially under the intersection with the upper wall portion. The bending portion on the front leg side is bent frontward with an obtuse angle to a part below buckling point in the front leg portion.

6 Claims, 9 Drawing Sheets

STEERING WHEEL

BACKGROUND OF THE INVENTION

1. Field of the Invention

This invention relates to a steering wheel in which an impact energy absorber made of sheet metal is disposed in a pad disposed above a boss portion.

2. Description of the Prior Art

As shown in FIG. 1, a conventional impact energy absorber 11 made of sheet metal disposed in a steering wheel 1 is composed of a deformation portion 12 having a section in nearly an inverted U shape provided with an upper wall portion 13 and leg portions 14 and 15 extending downwardly from the front and rear edges of the upper wall portion 13 leg portions 14 and 15 are formed by bending the sheet metal by press working a base portion 16 connected to the lower ends of the leg portions 14 and 15 of the deformation portion 12. The leg portions 14 and 15 of the deformation portion 12 are connected to the base portion 16 such that the lower ends of front and rear leg portions 14 and 15 are extended and bent inside the impact energy absorber 11, respectively, and the bent portions 14a and 15b are connected to the base portion 16 by welding. Further, the upper wall portion 13 of the deformation portion 12 is formed so that the front side is lower by shortening the length of the front leg portion 14. In addition, front and rear leg portions 14 and 15 of the deformation portion 12 are buckled in the middle as at buckling points 14b and 15b so that respective leg portions 14 and 15 buckle easily when an impact force is applied from above of respective leg portions 14 and 15. Reference numeral 3 denotes a boss plate, numeral 4 denotes a spoke core member and numeral 5 denotes a pad (see Japanese Patent Application Laid-Open No. 58-152660).

In the conventional steering wheel 1, when the impact force F is applied from right above to the center of the upper wall portion 13 of the impact energy absorber 11, the upper wall portion 13 first bends in to some extent so as to dent the center thereof. When the upper wall portion 13 bends so as to dent at the center thereof, the front and rear leg portions 14 and 15 are elastically deformed so as to extend outwardly. However, since above said impact force F is big and deforms portion 12 in a short time, the leg portions 14 and 15 buckle either inwardly or outwardly in the vicinity of buckling points 14b and 15b and the upper wall portion 13 approaches the base portion 16 so as to absorb the energy of the impact force F. The reason why the leg portions 14 and 15 extend outwardly or collapse inwardly at the buckling points is that, although bending occurs at the neighborhood of intersections X1 and X2 with leg portions 14 and 15 of the upper wall portion 13 thus producing work hardening, bending also occurs at the buckling points 14b and 15b thus producing work hardening. Because the bent angles at the buckling points 14a and 15b are shallower and the degree of work hardening is lower than that at intersections X1 and X2, deformation first begins at buckling points 14b and 15b.

In order to make visibility with the conventional steering wheel 1 better, it is necessary to modify the upper wall portion 13 by inclining it more as an impact energy absorber 110 as shown in FIG. 2.

With this impact energy absorber 110, however, a component force Fa of the impact force F working in a direction at a right angle to the upper wall portion 13 will have a great influence when the impact force is applied from right above to the center of the upper wall portion 13.

That is, in this case, the front leg portion 14 and the rear leg portion 15 will be deformed so as to collapse rearwardly without buckling at buckling points 14b and 15b. Instead, the absorber will deform at the intersections of the upper wall portion 13 and legs portions 14 and 15 and at the intersections of bending portions 15a and 14a and leg portions 15 and 14, respectfully.

In the impact energy absorber 110, however, work hardening is produced in the neighborhood of intersections which are bent, and an initial load at the time of deformation is heavy when the front leg portion 14 and the rear leg portion 15 fall to the backside as described previously.

That is, when the impact force F is applied to the center of the upper wall portion 13 from right above, the upper wall portion 13 bends first in some degree so as to dent the center thereof (see the middle figure in FIG. 3). At this time, the neighborhood of respective intersections X1 and X2 bend and work hardening is produced there, and the front and the rear leg portions 14 and 15 are deformed elastically so as to bow outwardly. In this state, inflection points X11, X12, X21 and X22 between a circular arc portion at respective intersections where bending is applied and work hardening is produced and a straight line portion where no work hardening is produced are bent.

Thereafter, the front leg portion 14 and the rear leg portion 15 are deformed in such a manner that they fall rearwardly of the steering wheel with the respective intersections X1, X2, Y1 and Y2 plastic deformed parts (see lower figure in FIG. 3). At this time, the region of the inflection points X12, X21, X22, Y11 and Y12 are also bent practically.

At this time, in the front leg portion 14, the intersection Y1 is applied with bending at an acute angle. As a result, the part Y11 in the region of the intersection Y1 where bending is started is high, and in the moment of the component force Fa of the impact force F acting at a right angle to the upper wall portion 13, the distance 1 0 from the working point to the deformation part Y11 is short, so the initial load at the time of deformation of the deformation part Y11 is high.

SUMMARY OF THE INVENTION

It is an object of the present invention to provide a steering wheel which is capable of absorbing a predetermined quantity of energy by checking the increase of initial load in deformation when the impact force is applied from right above to the center of the upper wall portion of the deformation portion even if the front side of the upper wall portion in the deformation portion is lower by shortening the length of the front leg portion of the deformation portion of the impact energy absorber.

The foregoing object may be achieved with a steering wheel comprising: a ring portion; a boss portion having a boss and disposed substantially at the center of said ring; a spoke portion connecting between said boss portion and said ring portion; a pad, a front side of said pad being vertically lower than a rear side and disposed above said boss portion; and an impact energy absorber composed of a deformation portion having a section in substantially a U-shape formed by bending sheet metal and a base portion connected to the lower end of said deformation portion and disposed between said pad and said boss.

The deformation portion is provided with an upper wall portion inclining to a front side, leg portions extending downward from front and rear edges of the upper wall portion and a bending portion disposed being bent at the lower ends of said front and rear leg portions and connected to base portion.

The front leg portion and the rear leg portion are provided with buckling points at approximately the middle part thereof in a vertical direction, and buckled inside said impact energy absorber.

The bending portion on the side of said front leg portion is bent toward a front side at an obtuse angle to the part below the buckling point on the front leg portion.

That is, in the neighborhood of the intersection of the leg portion and bending portion, bent angle is small and work hardening is low as compared with the neighborhood of respective intersections of the upper wall portion and other front leg portion and rear leg portion and the neighborhood of the intersection of the rear leg portion and the bending portion at the lower end thereof.

As the result, in the front leg portion, the part where bending starts in the neighborhood of the intersection with the bending portion is lower, and in the moment of the component force of the impact force applied to the upper wall portion at a right angle, the distance from the working point to the deformation part gets longer than that in the prior impact energy absorber described above with reference to FIG. 2 and FIG. 3, thus making it possible to control the initial load of deformation in the region of the intersection with the bending portion at low level.

Thus, according to the steering wheel of the present invention, it is possible to control the initial load at the time of deformation at a low level as compared with a steering wheel using the prior impact energy absorber 110 described with reference to in FIG. 2 when an impact force is applied from right above to the center of the upper wall portion of the impact energy absorber.

Then, after the region at the intersection with the bending portion of the front leg portion starts to be bent, the front leg portion is deformed elastically in such a manner that it falls rearwardly without deformation by buckling, and the rear leg portion is also deformed elastically in such a manner that it falls rearwardly without deformation by buckling by the influence of deformation of the front leg portion.

Due to the fact that the neighborhood of the intersection with the bending portion of the front leg portion starts to bend after standing the deformation to some extent, it is possible to absorb a predetermined quantity of energy of the impact force.

Thus, according to the steering wheel of the present invention, even if the length of the front leg portion of the deformation portion in the impact energy absorber is shortened so as to make the front side of the upper wall portion in the deformation portion lower in height, it is checked that the initial load at the time of deformation gets high when the impact force is applied from right above to the center of the upper wall portion of the deformation portion, thus enabling it to absorb a predetermined quantity of energy.

DESCRIPTION OF THE PREFERRED EMBODIMENT

An embodiment of the present invention will be described hereafter with reference to the accompanying drawings.

Figure 4:
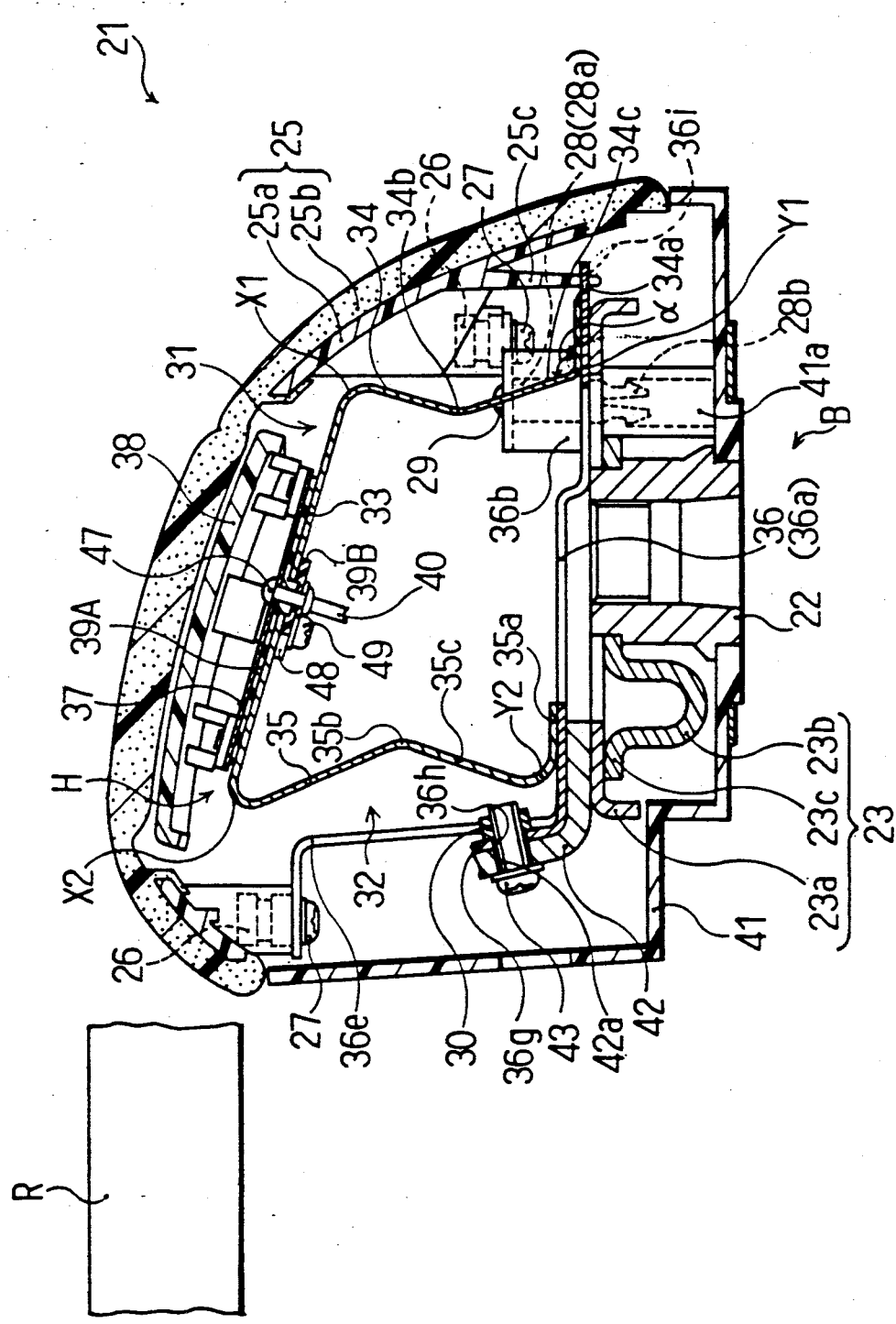
FIG. 4 is a cross-sectional view showing an embodiment of a steering wheel according to the present invention, which is taken along a line IV—IV in FIG. 5.
Figure 5:
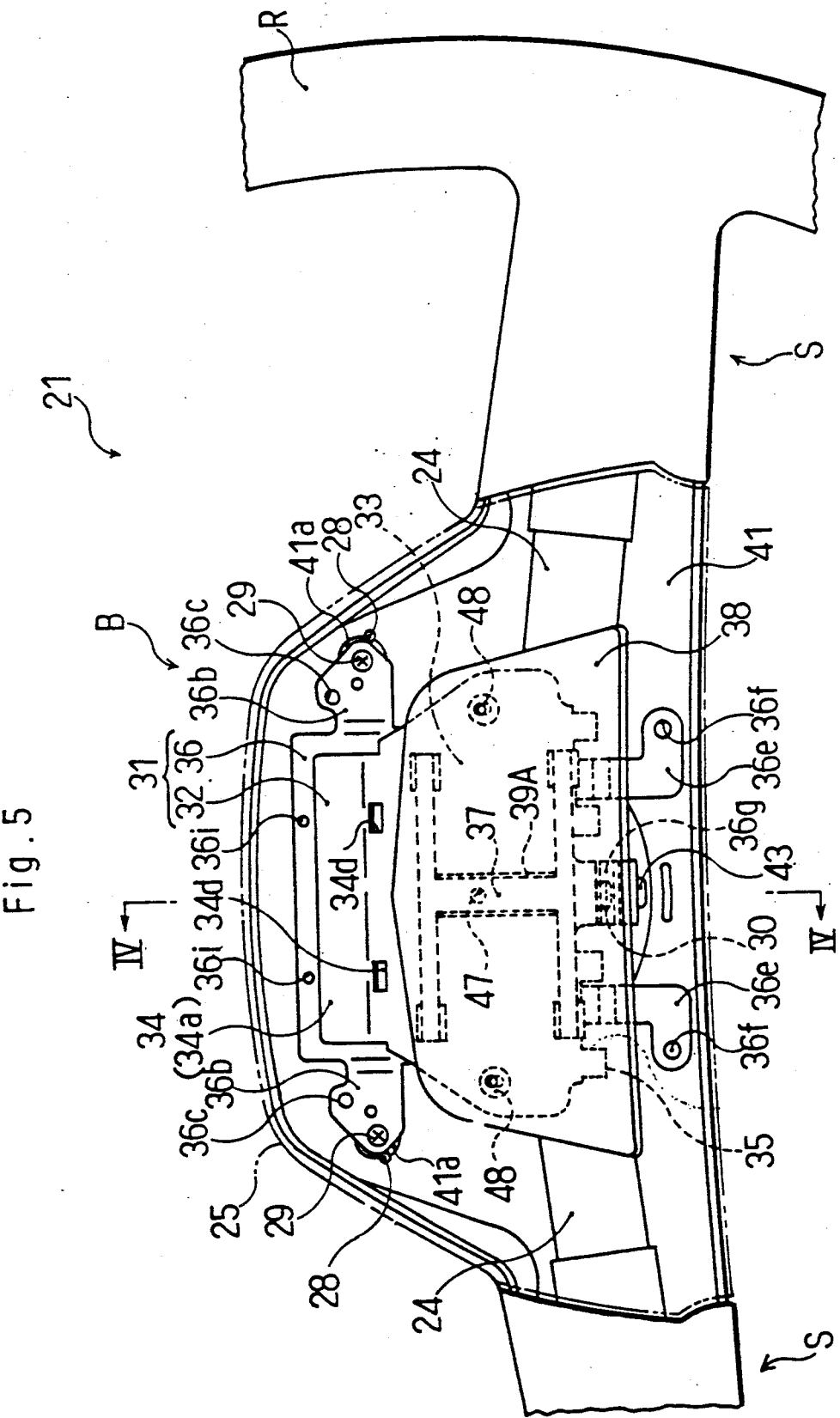
FIG. 5 is a plan view showing the structure of FIG. 4 with the pad removed.

A steering wheel 21 of the invention is shown in FIG. 4 and FIG. 5 and is provided with two spoke portions S, and their core members 24 are connected to a boss 22 of a boss portion B through a self-aligning mechanism 23c provided with a plurality of deformation arm portions 23b. The self-aligning mechanism 23 moves a ring portion R surface by transforming the deformation arm portions 23b elastically when an impact force is applied to the ring portion R.

A pad 25 composed of an insert 25a made of hard synthetic resin and a coating layer 25b made of soft synthetic resin which covers the insert 25a is disposed above the boss portion B, and an impact energy absorber 31 made of sheet metal is disposed inside this pad 25. This pad 25 is so made that the front side of the pad 25 is lower than the rear side, taking the visibility of dials and the like after mounting the steering wheel 21 on a vehicle into consideration.

Impact energy absorber 31 is composed of a deformation portion 32 having a nearly inverted U-shape that is formed by bending sheet metal and a base portion 36 that is formed by bending sheet metal.

The deformation portion 32 is composed of an upper wall portion 33 which inclines to the front side, leg portions 34 and 35 extending downward from front and rear edges of the upper wall portion 33, and bending portions 34a and 35a which extend from lower ends of the leg portions 34 and 35 and welded to the base portion 36.

Figure 6:
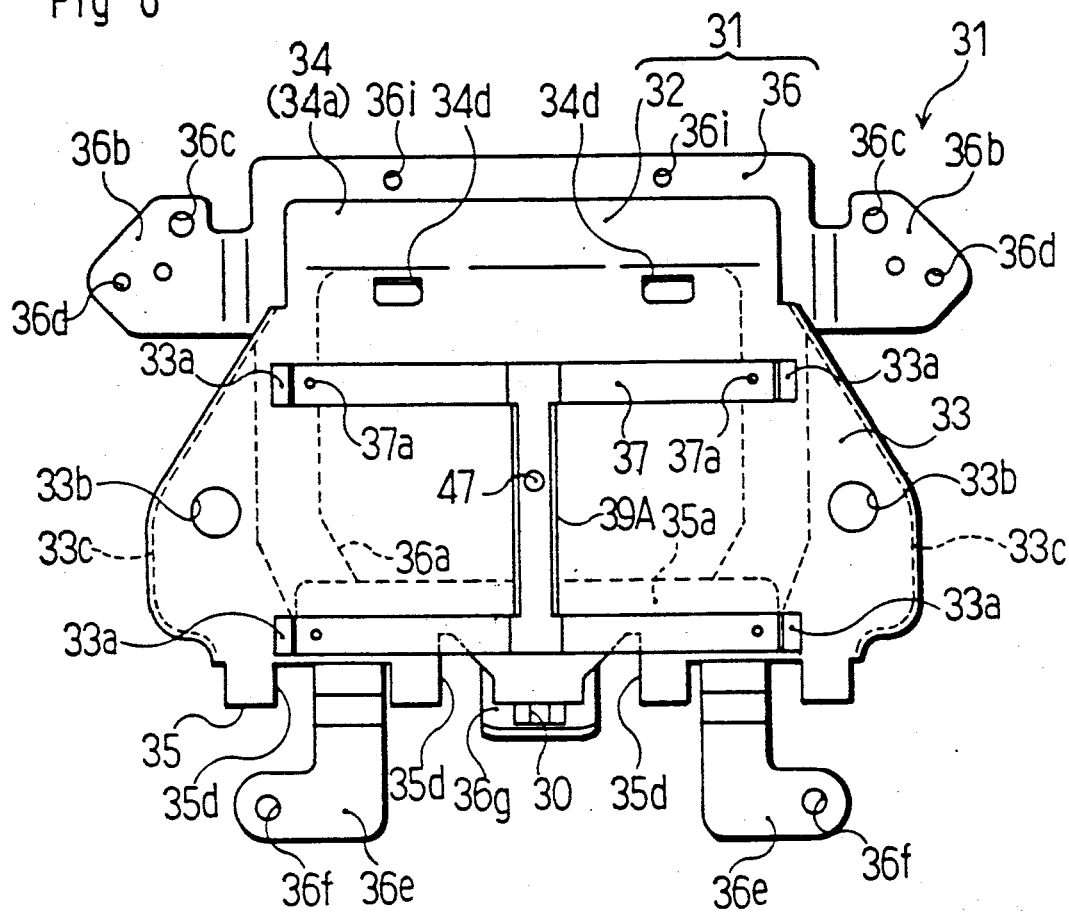
FIG. 6 is a plan view of an impact energy absorber.
Figure 7:
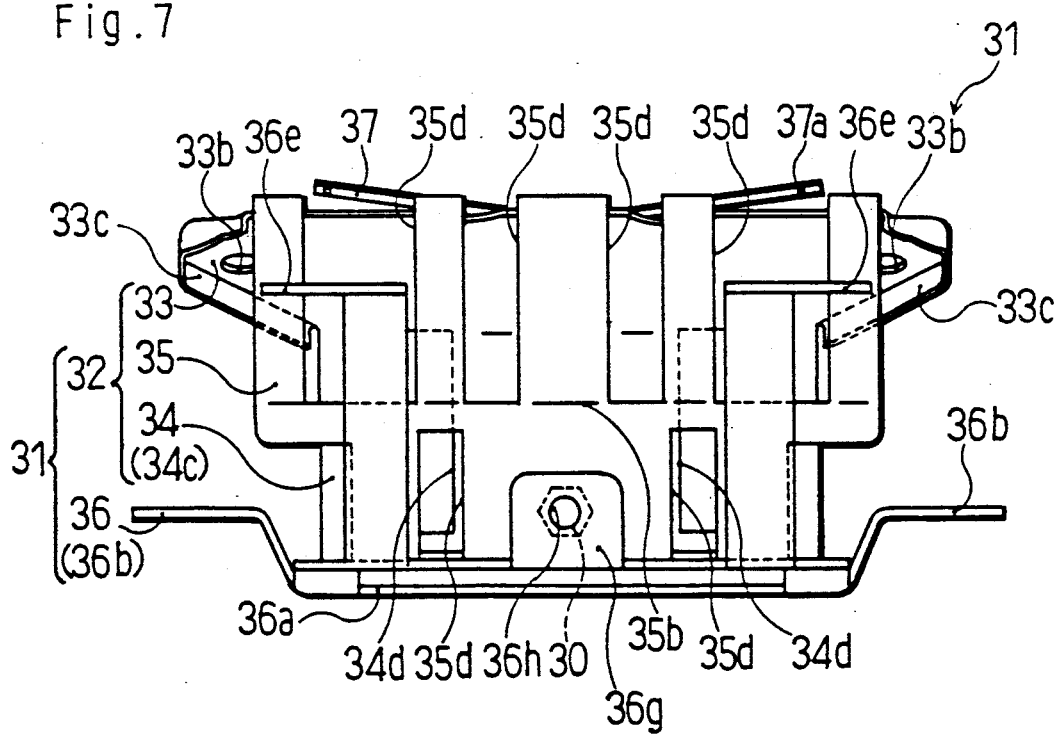
FIG. 7 is a front view of an impact energy absorber.

In the illustrated embodiment a downwardly reinforcing rib 33c is formed on both left and right edges of the upper wall portion 33 (see FIG. 6 and FIG. 7). This reinforcing rib 33c is formed in order to increase the rigidity of the upper wall portion 33 so that the leg portions 34 and 35 will be deformed without bending the upper wall portion 33 so much when the impact force F is applied from above to the upper wall portion 33.

The front and rear leg portions 34 and 35 are provided with slits 34d and 35d (see FIG. 7 and FIG. 8) for adjusting rigidity in a vertical direction (buckling strength and bending strength in a vertical direction), and are also provided with buckling points 34b and 35b so that respective leg portions 34 and 35 buckle inside the impact energy absorber 31 at an approximate vertically intermediate part.

The reason why the front and rear leg portions 34 and 35 buckled inside is for deforming respective leg portions 34 and 35 by buckling when the impact force is applied from right above to respective leg portions 34 and 35, thereby to absorb a predetermined quantity of energy.

Also, intersections Y1 and Y2 below the front and rear leg portions 34 and 35 and bending portions 34a and 35a are almost under the intersections X1 an X2 with the upper wall portion 33.

Furthermore, in the illustrated embodiment, a portion 34e (see FIG. 9) above the buckling point 34b on the front leg portion 34 is formed so as to be substantially at a right angle to the upper wall portion 33. The reason why the upper portion 34e is disposed at a right angle to the upper wall portion 33 is that, when the impact force F is applied from right above to the upper wall portion 33, the portion 34c below the buckling point 34b is bent surely with the neighborhood of the intersection Y as the center without deforming the upper portion 34e so much against the component force Fa of the impact force F acting at a right angle to the upper wall portion 33.

Figure 9:
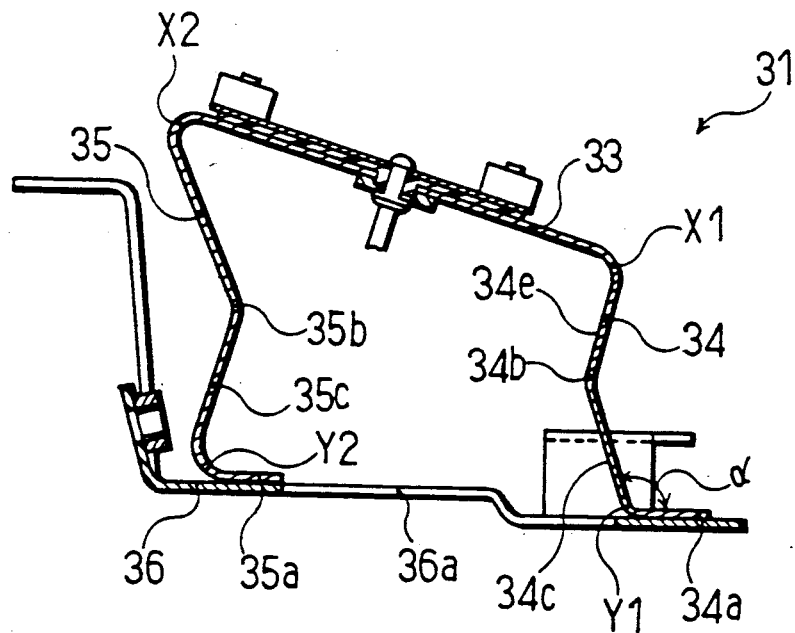
FIG. 9 is a cross-sectional view of an impact energy absorber which is taken along a line IX—IX in FIG. 8.

Furthermore, the portion 35c below the buckling point 35b of the rear leg portion 35 is formed so as to be in parallel to the upper portion 34e (FIG. 9). The reason why the lower portion 35c is formed in parallel to the upper portion 34e is that the neighborhood of the intersection X2 is made to be bent easily so that the neighborhood of intersection Y1 of the front leg portion 34 is deformed smoothly against the component force Fa of the impact force F acting at a right angle to the upper wall portion 33.

The bending portion 35a on the side of the rear leg portion 35 is formed by being bent toward the front side of the steering wheel 21 which is the inside of the impact energy absorber 31, and the bending portion 34a on the side of the front leg portion 34 is formed by being bent toward the front side of the steering wheel 21 which is the outside of the impact energy absorber 31. This bending portion 34a on the side of the front leg portion 34 is bent drawing a circular arc by adjusting a buckling angle of the buckling point 34b so that an angle α of the bending point 34a to a lower part 34c below the buckling point 34b forms an obtuse angle (98 degrees in the embodiment). Besides, it is preferred that this angle be between illustrated 91 degrees and 120 degrees. If the angle is 90 degrees or less, the angle at the part X1 becomes an acute angle and the position of Y1 also falls inside of under X1. Therefore, in the moment of the component force Fa of the impact force F, the distance from the working point to the deformation part Y1 is shorter and there is a possibility that deformation occurs at the part X1 or at the buckling point 34b before the part Y1, thus predetermined energy cannot be absorbed. Also, if the angle is 121 degrees or more, the position of Y1 falls considerably outside of under X1, causing the moment to become larger. Therefore, the initial load at the time of deformation becomes too light to absorb predetermined energy.

The base portion 36 is provided at the center thereof with a through hole 36a for disposing a nut, etc. (not shown) used for mounting the steering wheel 21 to a vehicle. Fitting pieces 36b and 36e are turned upward at peripheral edges and further provide on both sides of the front portion and the rear portion. A fitting piece 36g is provided projecting upwardly at the center of the rear portion.

The fitting pieces 36b and 36e with through holes 36c and 36f which have a screw 27 screw-clamped to a nut 26 which is buried in an insert 25a of the pad 25 so that the pad 25 may be coupled to the fitting pieces 36b and 36e with screw 27. Also, through holes 36d (see FIG. 6) are bored in the fitting pieces 36b so that hook legs 28 may be clamped with screws 29 to respective fitting pieces 36b (FIG. 9). The hook leg 28 is formed of synthetic resin and is provided with a shaft portion 28a and a head portion 28b which is provided at the lower end of the shaft portion 28a and is capable of reducing the diameter thereof elastically, and hooks the head portion 28b to a hook cylinder portion 41a of a lower cover 41.

A through hole 36h is bored on a fitting piece 36g and a nut 30 is fixed on the peripheral edge thereof. This nut 30 clamps a screw 43 screwed through a through hole 42a of a fitting piece 42 fixedly attached to the ring plate 23a of the self-aligning mechanism 23, so as to clamp the fitting piece 36g to the fitting piece 42. Thus, the impact energy absorber 31 with the pad 25 clamped with the screw 27 is disposed on the boss 22 by utilizing nut 30 and hook leg 28.

An engaging hole 36i is bored in the vicinity of the front edge of the base portion 36 for receiving a projection 25c projecting downward from the insert 25a of the pad 25 when the pad 25 is clamped to the impact energy absorber 31.

In the illustrated embodiment, the upper wall portion 33 also has the function of a fixed contact plate forming a horn switch mechanism H with a movable contact plate 37 made of a leaf spring disposed above the upper wall portion 33.

When viewed from above, the movable contact plate 37 has a substantially I-shape, and is provided with contacts 37a (see FIG. 8) corresponding to contacts 33a of the fixed contact plate 33 (upper wall portion) at four point parts. It is fixed to the fixed contact plate 33 by means of a rivet 47 having insulating plates 39A and 39B interposed therebetween. A lead wire 40 is connected to the rivet 47 so that the movable contact plate 37 may be electrically connected to a positive side of a horn switch circuit. The electrically connected fixed contact plate 33 is formed so as to be electrically connected to a negative side of the horn switch circuit through the leg portions 34 and 35, the base portion 36, the self-aligning mechanism 23 and the boss 22.

Figure 8:
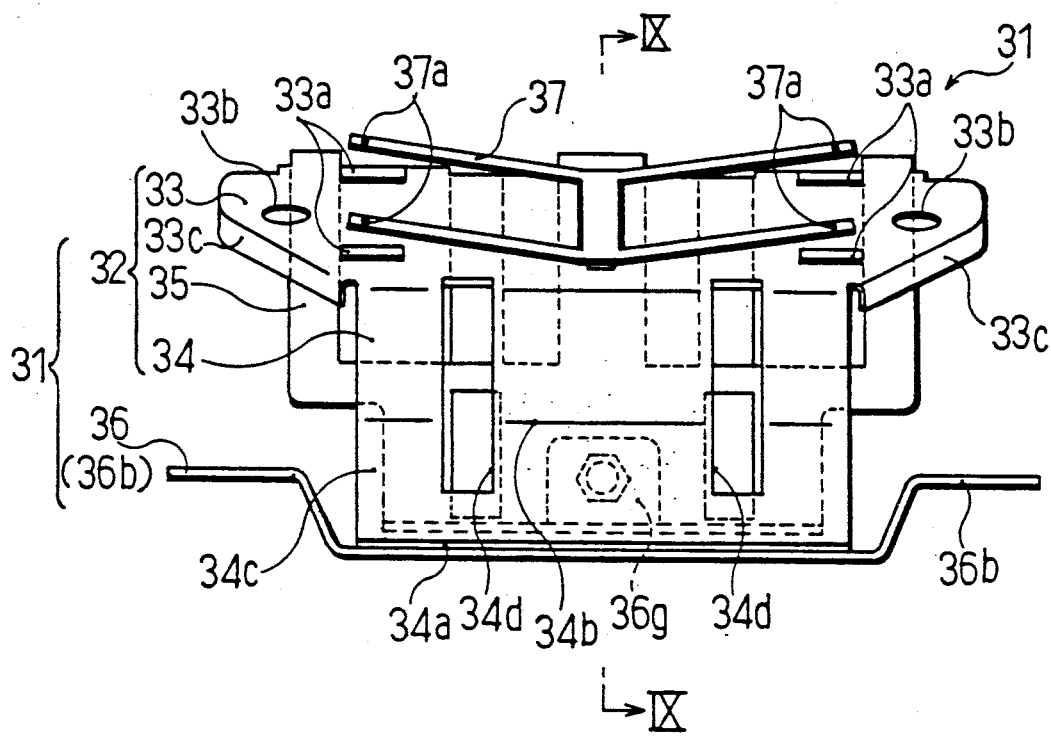
FIG. 8 a rear view of an impact energy absorber.

Above this movable contact plate 37, a pressurizing plate 38 made of synthetic resin is spaced from the fixed contact plate 33 and is movable downward by means of a cylindrical guide member 48 (see FIG. 5) clamped with a screw 49 from under the fixed contact plate 33 through a through hole 33b (see FIG. 8). As the result, when the upper wall of the pad 25 is pushed down together with the pressurizing plate 38, the contact 37a of the movable contact plate 37 contacts the contact 33a of the fixed contact plate 33, thus activates the horn switch mechanism H.

In the next place, a mode when the steering wheel 21 of this embodiment is mounted on a steering shaft of a vehicle and an impact force F is applied from right above to the center of the upper wall portion 33 of the impact energy absorber 31 will be described (see FIG. 10).

Figure 10:
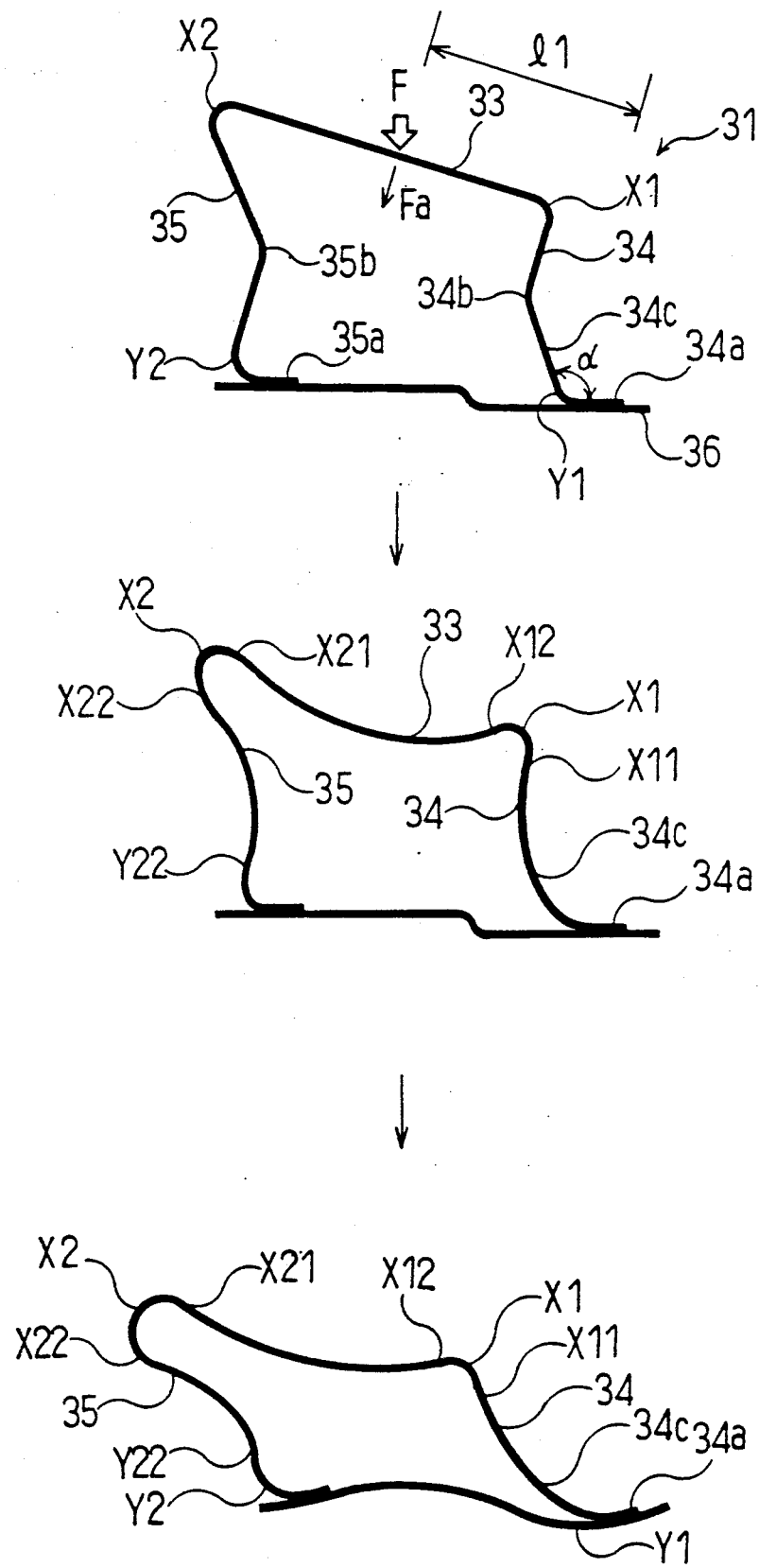
FIG. 10 shows schematic views showing deformation mode of an impact energy absorber in consecutive order.

First, the upper wall portion 33 bends slightly so as to dent the center thereof (see the middle figure of FIG. 10). At this time, the front and rear leg portions 34 and 35 are deformed elastically so as to bow slightly outwardly. At this time, the vicinity of respective intersections X1 and X2 is bent and work hardening is produced there, and the neighborhood of inflection points X11, X12, X21 and X22 of a circular arc portion where work hardening is produced in the vicinity of respective intersections and a straight line portion where no work hardening is produced are bent.

Therefore, the front leg portion 34 and the rear leg portion 35 are deformed in a manner that they fall toward the rear of the steering wheel 21 with the vicinity of respective intersections X1, X2, Y1 and Y2 as plastic deformation part (see the lowest figure of FIG. 10). At this time also, the vicinity of inflection points (X11, X12, X21, X22 and Y22, etc.) is bent.

At this time, in the vicinity of the intersection Y1, the bending portion 34a on the side of the front leg portion 34 forms an obtuse α to the part 34c below the buckling point 34b in the front leg portion 34 before deformation in FIG. 10. That is, in the vicinity of the intersection Y1, the bent angle is smaller and work hardening is less before deformation compared with the vicinity of other intersections X1, X2 and Y2.

Figure 1:
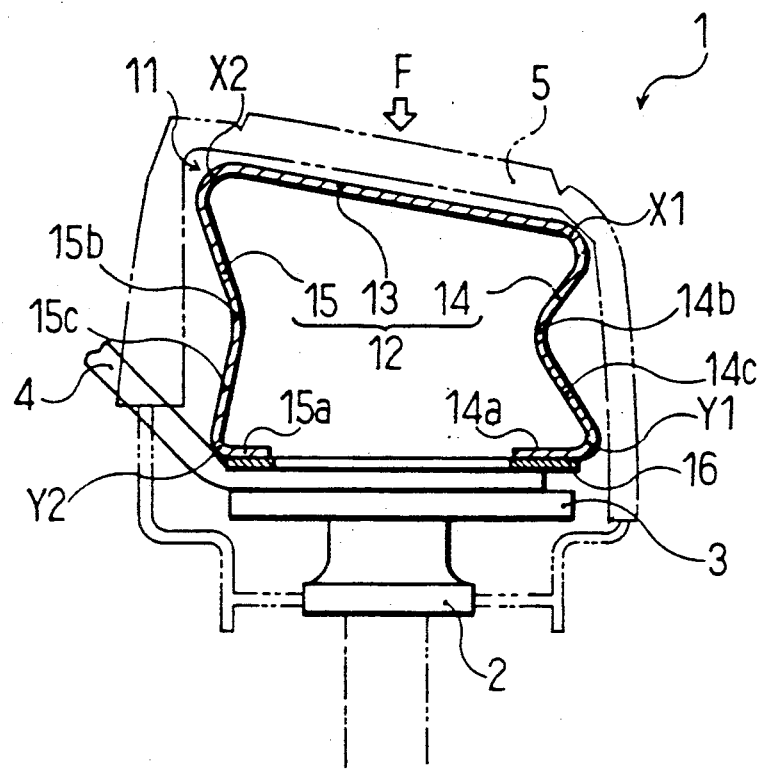
FIG. 1 is a schematic cross-sectional view of a conventional steering wheel.
Figure 2:
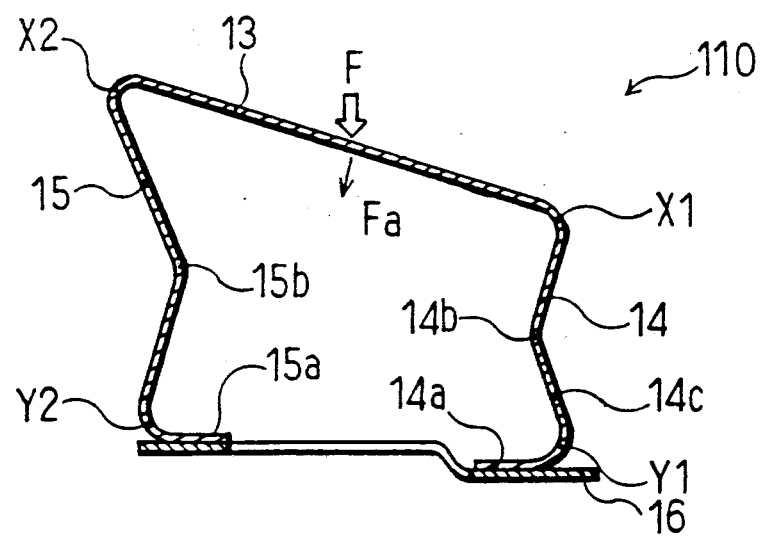
FIG. 2 is a cross-sectional view of an impact energy absorber obtained by improving a conventional type.
Figure 3:
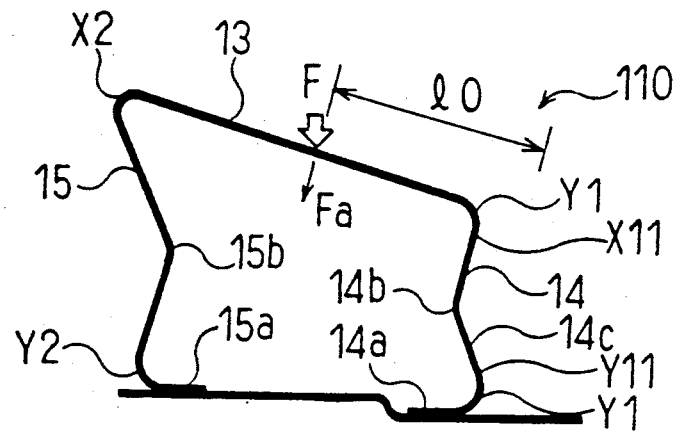
FIG. 3 shows schematic views showing deformation mode of an improved impact energy absorber in consecutive order.
Figure 3:
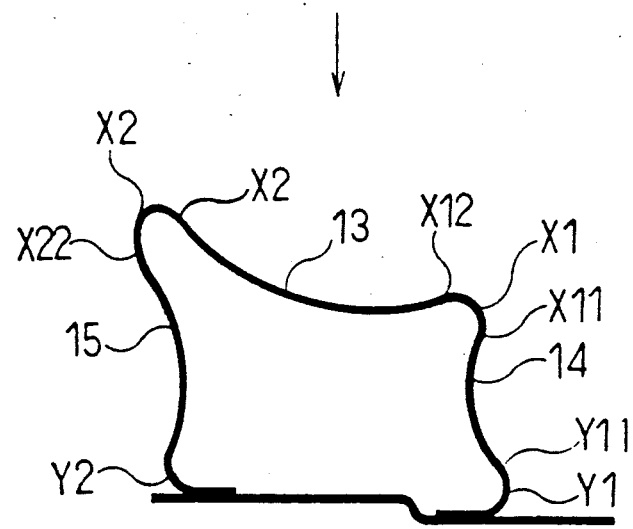
Figure 3:
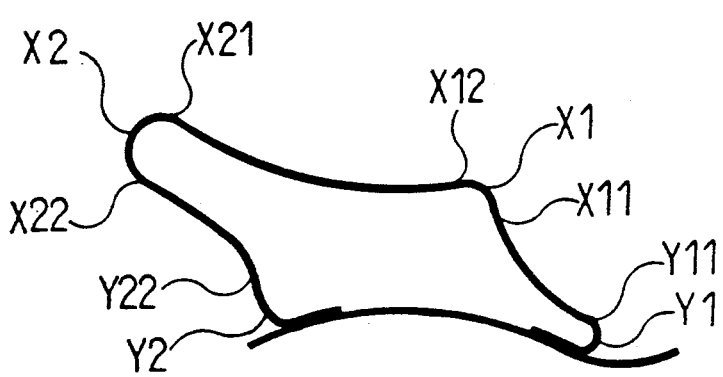

As the result, bending is started at a low position almost coincident with the part Y1 in the neighborhood of the intersection Y1. Here, the value of the initial load at the time of deformation point where the component force Fa of the impact force F which is applied to the deformation part Y1 is made longer than the case of the impact energy absorber 110 shown in FIG. 2.

In the impact energy absorber 31, the intersection Y1 with the bending portion 34a of the front leg portion 34 is arranged at a substantially downward position of the intersection X1 with the upper wall portion 33 of the front leg portion 34 before deformation.

As the result, since it is possible to shorten the distance l 1 from the working point where the component force Fa of the impact force F is applied to the deformation part Y1 when the front leg portion 34 and the rear leg portion 35 fall to the backside without deformation by buckling, the initial load when the deformation part Y1 starts to bend will never be very low.

Figure 12:
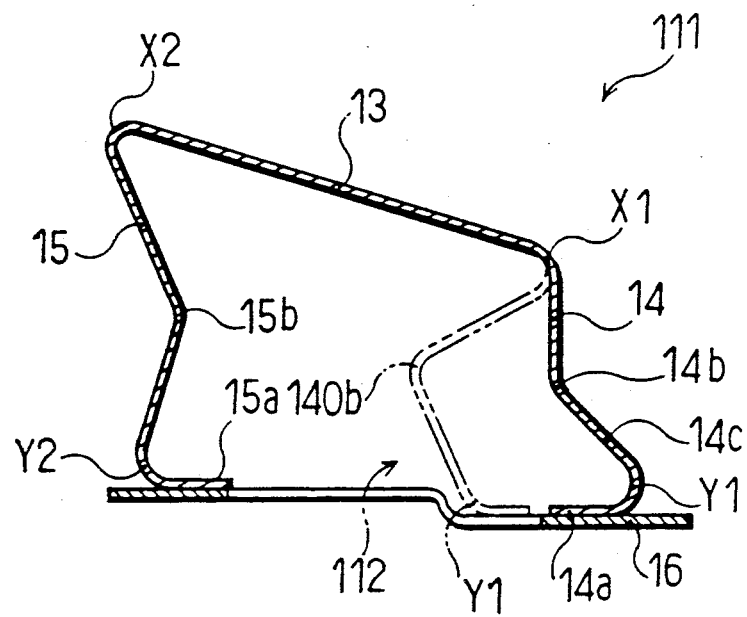
FIG. 12 is a cross-sectional view of an impact energy absorber showing a comparison example.
Figure 13:
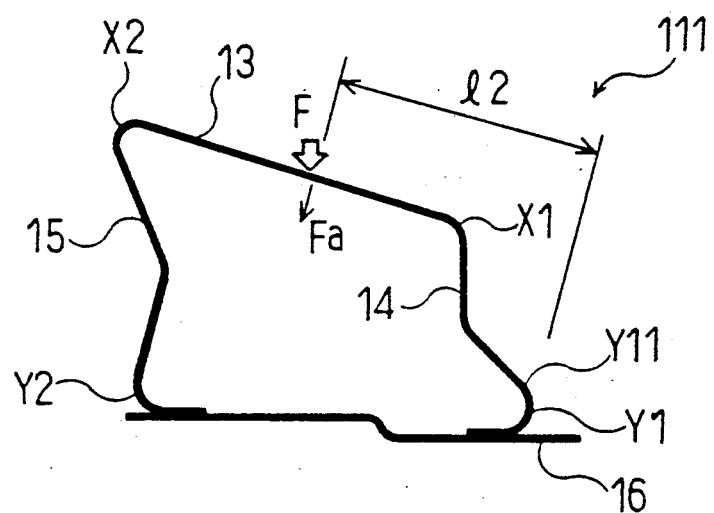
FIG. 13 shows schematic views showing deformation mode of the impact energy absorber shown in FIG. 12 in consecutive order.
Figure 13:
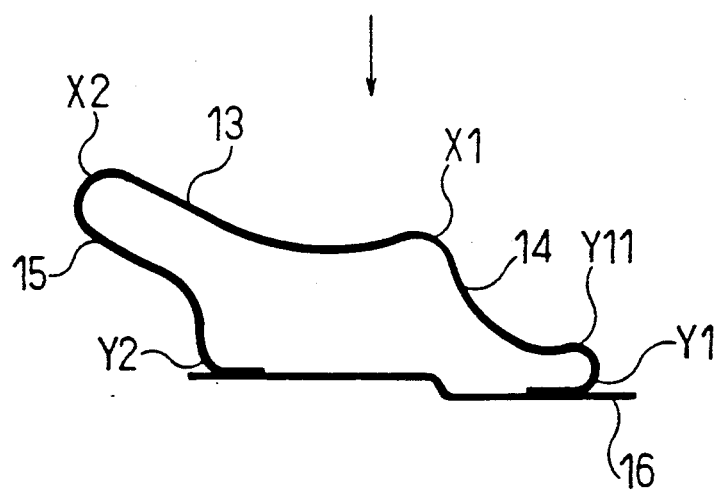

When an impact energy absorber 111 in which the intersection Y1 of a front leg portion 14 with a bending portion 14a is posted frontward of the intersection X1 with an upper wall portion 13 of the front leg portion 14, as shown in FIG. 12 for instance, the following mode is produced. That is, as shown in FIG. 13, a distance l 2 from the working point where the component force Fa of the impact force F is applied to a deformation part Y11 becomes longer in this impact energy absorber 111, hence the initial load when the deformation part Y11 starts to bend becomes too low.

Figure 11:
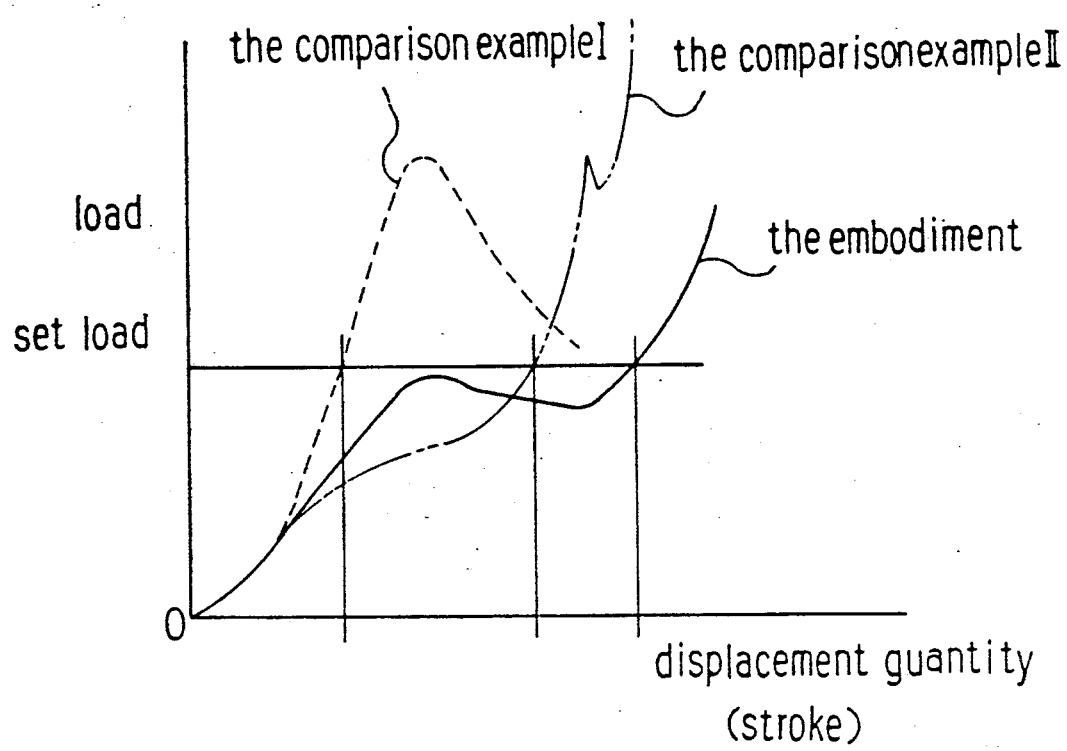
FIG. 11 is a graph showing the relationship between the load at the time of impact and the displacement quantity (stroke) of the descent of the upper wall portion when an impact force is applied from right above to the center of the upper wall portion of an impact energy absorber of the invention, which also shows other comparison examples.

Specifically, FIG. 11 shows a graph representing the relationship in an embodiment of the steering wheel 21 between the load at the time of impact when the impact force F is applied from right above to the center of the upper wall portion 33 in the impact energy absorber 31 and the displacement quantity (stroke) of the descent of the upper wall portion 33. A solid line shows that of an embodiment of the steering wheel 21. A broken line shows that of a steering wheel using the impact energy absorber 110 shown in FIG. 2 (comparison example I) which is similar to the steering wheel 21 in the embodiment except that the bending portion 14a of the impact energy absorber 110 is bent rearward at an acute angle. Also, a two-dot chain line shows that of a steering wheel using an impact energy absorber 111 shown in FIG. 12 (comparison example II), which is similar to the steering wheel in the embodiment except the posted position of the intersection Y1 and the angle of the buckling point 14b.

As seen from the graph shown in FIG. 11, in the steering wheel of the embodiment, the curve rises sharply at the beginning when the impact force F is applied and shifts horizontally within the limit of set load thereafter. That is, the area in the lower part of the curve shows the energy absorbing quantity, but the energy of the impact force F is absorbed efficiently within the limit of set load in the steering wheel 21 of the embodiment.

In the comparison example I, the curve rises sharply from the beginning when the impact force F is applied and deformation starts after the limit of set load is exceeded by far.

Also, in the comparison example II, the impact energy absorber 111 is immediately deformed plastically, and the ring plate 23a is going to be deformed thereafter. Therefore, the curve rises gently from the beginning when the impact force F is applied, and rises sharply thereafter to exceed the limit of the set load by far.

Accordingly, in the steering wheel 21 of the embodiment, it is possible to absorb a predetermined quantity of energy efficiently by suppressing the initial load of deformation to get heavy when the impact force F is applied from right above to the center of the upper wall portion 33 of the impact energy absorber 31.

An embodiment which uses the impact energy absorber 111 with the intersection Y1 in front of the intersection X1 has been described. However, when an impact energy absorber 112 in which the intersection Y1 is arranged rearwardly from the intersection X1 is used, a buckling point 140b of the impact energy absorber 112 extends rearwardly. Therefore, the vicinity of the buckling point 140b as well as the vicinity of the intersection Y1 are easy to be deformed and a curve resembling the graph shown with a two-dot chain line in FIG. 11 will be shown.

I claim:
1. A steering wheel comprising:
   a ring portion;
   a boss portion having a boss and disposed substantially at the center of said ring portion;
   a spoke portion connecting said boss portion and said ring portion;
   a pad, a front side of said pad being lower than a rear side thereof, said pad being disposed above said boss portion; and an impact energy absorber composed of a deformation portion having a substantially inverted U-shape and a base portion connected to a lower end of said deformation portion, said impact energy absorber being disposed between said pad and said boss, said deformation portion including an upper wall portion inclining to a front side, leg portions extending downwardly from front and rear edges of said upper wall portion and a bending portion defined respectively at lower ends of said front and rear leg portions and being connected to said base portion, said front leg portion and said rear leg portion being provided with buckling points at substantially vertical midportions thereof and being buckled to extend inwardly of said impact energy absorber, an intersection of said front leg portion and said bending portion being substantially vertically below and in a vertical plane of an intersection between said upper wall portion and said front leg portion, and said bending portion defined at said lower end of said front leg portion being bent towards a front side of said impact energy absorber at an obtuse angle to a portion of said front leg portion below said buckling point of said front leg portion.

2. A steering wheel according to claim 1, wherein said obtuse angle of said bending portion is between about 91 degrees and about 120 degrees.

3. A steering wheel according to claim 1, wherein a portion of said front leg portion above said buckling point in said front leg portion is formed substantially at a right angle to said upper wall portion.

4. A steering wheel according to claim 1, wherein a portion of said front leg portion above said buckling point in said front leg portion is formed substantially at a right-angle to said upper wall portion, and a portion of said rear leg portion below said buckling point in said rear leg portion is formed substantially parallel to said portion above said buckling point in said front leg portion.

5. A steering wheel according to claim 1, wherein a downwardly extending reinforcing rib is formed on both left and right edges of said upper wall portion.

6. A steering wheel according to claim 1, wherein a movable contact plate is disposed on an upper surface of said upper wall portion so as to define a fixed contact plate corresponding to a movable contact plate in a horn switch mechanism.

* * * * *